(12) United States Patent
Pappu et al.

(10) Patent No.: US 10,185,695 B2
(45) Date of Patent: Jan. 22, 2019

(54) DEVICE, SYSTEM AND METHOD FOR ON-CHIP TESTING OF PROTOCOL STACK CIRCUITRY

(71) Applicant: Intel Corporation, Santa Clara, CA (US)

(72) Inventors: Lakshminarayana Pappu, Folsom, CA (US); Yonah Lasker, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 117 days.

(21) Appl. No.: 15/476,513

(22) Filed: Mar. 31, 2017

(65) Prior Publication Data

US 2018/0285305 A1 Oct. 4, 2018

(51) Int. Cl.
*G06F 13/42* (2006.01)
*G06F 13/36* (2006.01)
*G06F 13/40* (2006.01)

(52) U.S. Cl.
CPC .............. *G06F 13/42* (2013.01); *G06F 13/36* (2013.01); *G06F 13/4022* (2013.01)

(58) Field of Classification Search
CPC ....... G06F 13/42; G06F 13/36; G06F 13/4022
USPC .......................................................... 710/105
See application file for complete search history.

(56) References Cited

U.S. PATENT DOCUMENTS

| | | | | |
|---|---|---|---|---|
| 6,813,729 B1* | 11/2004 | Tsang | .................. | G06F 11/2221 712/39 |
| 8,949,471 B2* | 2/2015 | Hall | ........................ | H04L 29/06 709/250 |
| 2004/0033814 A1* | 2/2004 | Azuma | ............. | H04M 1/72519 455/558 |
| 2012/0232825 A1* | 9/2012 | Patil | ....................... | G06F 11/267 702/117 |
| 2012/0233504 A1* | 9/2012 | Patil | .................... | G06F 11/2242 714/30 |
| 2013/0080832 A1* | 3/2013 | Dean | ................... | G06F 11/3664 714/32 |
| 2013/0238935 A1* | 9/2013 | Radulescu | ............ | G06F 11/221 714/32 |
| 2017/0136905 A1* | 5/2017 | Ricci | ................... | B60L 11/1848 |
| 2017/0184667 A1* | 6/2017 | Bhatt | .................. | G06F 11/1004 |
| 2018/0188321 A1* | 7/2018 | Pappu | .............. | G01R 31/31701 |
| 2018/0246796 A1* | 8/2018 | Pappu | ................... | G06F 11/277 |

OTHER PUBLICATIONS

U.S. Appl. No. 15/394,666, filed Dec. 29, 2016, Pappu et al.

* cited by examiner

*Primary Examiner* — Christopher B Shin
(74) *Attorney, Agent, or Firm* — Schwabe, Williamson & Wyatt, P.C.

(57) ABSTRACT

Techniques and mechanisms for providing test functionality at an integrated circuit (IC) chip. In an embodiment, the IC chip includes protocol stacks variously coupled each between a switch fabric and other switch circuitry which is configurable to selectively implement, at least in part, either of an operational mode and a test mode. The operational mode facilitates communication, via the switch circuitry, between a first protocol stack and physical layer circuitry. The test mode instead enables communication, between the first protocol stack and a second protocol stack, of test packet information which is based on a test packet received from the switch fabric. In another embodiment, the protocol stacks support communication according to a Thunderbolt™ protocol.

21 Claims, 8 Drawing Sheets

DEVICE, SYSTEM AND METHOD FOR ON-CHIP TESTING OF PROTOCOL STACK CIRCUITRY

BACKGROUND

1. Technical Field

Embodiments of the present invention generally relate to on-chip test logic and more particularly, but not exclusively, to structures for testing functionality of a protocol stack.

2. Background Art

Advances in semi-conductor processing and logic design have enabled an increase in the amount of logic that may be present on an integrated circuit (IC) device. As a result, successive generations of IC devices continue to shrink in size while supporting more storage, processing capability, communication bandwidth, etc. Some generally-available IC devices support interface standards—any of various Thunderbolt™ standards—which provide for data rates of 10 Gigabits per second (Gbps) and even up to or exceeding 20 Gbps.

As such high-speed IC devices continue to grow the number, variety and capability, manufacturers are starting to detect reliability problems. Such problems pose significant impediments to implementing next-generation improvements to device integration. Decreased link reliability also affects related technical areas, such as the need to securely provide firmware updates. The increasing integration, speed, and functionality of such IC devices poses challenges for manufacturers who need to debug, validate and launch products in a timely or cost-effective manner. Accordingly, there is expected to be an increasing premium placed on incremental improvements for providing solutions to test integrated circuitry.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
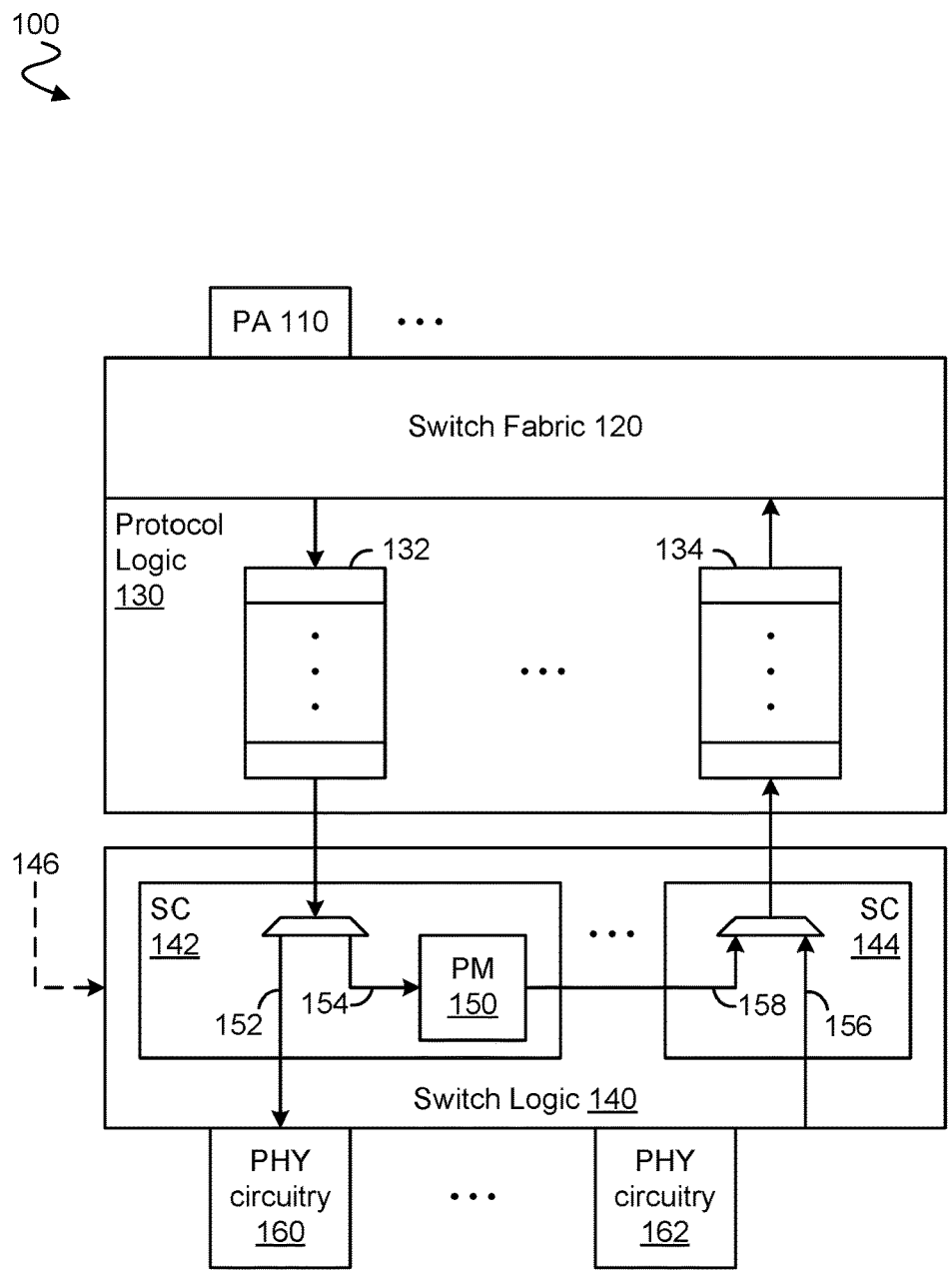
FIG. 1 is a functional block diagram illustrating elements of an integrated circuit chip to test protocol logic according to an embodiment.

Embodiments described herein variously include techniques and/or mechanisms for providing on-chip functionality to test the performance of circuitry including multiple protocol stacks. In an embodiment, an integrated circuit (IC) chip comprises a switch fabric and one or more adapters by which the switch fabric is coupled to other functional components (e.g., including a processor or other host) of the IC chip. Multiple protocol stacks of the IC chip may each be coupled between the switch fabric and other switch circuitry of the IC chip, where the switch circuitry is configurable to facilitate at least in part either one of an operational mode and a test mode. The operational mode may facilitate communication of a packet from a transmit protocol stack of the multiple protocol stacks—e.g., for communication of the packet from the IC chip.

By contrast, the test mode may instead result in a packet (e.g., the first packet or another packet based on the first packet) being communicated by the switch circuitry to a receive protocol stack of the multiple protocol stacks. In providing switch circuitry which is operable to selectively configure test functionality, some embodiments variously allow for test signals to be variously communicated through some or all of the multiple protocol stacks—e.g., where signature information may be collected based on such communications to enable performance evaluation with a test controller of the IC chip.

As used herein, "protocol stack" refers to a stacked configuration of circuit components ("layers") which implement at least in part a communication protocol of an interface standard. A protocol stack may include two or more layers that, for example, transport layer functionality, logic layer functionality and/or electric layer functionality. In some embodiments, a protocol stack is only a subset of a larger set of protocol stack circuitry—e.g., wherein the larger set is to provide all of the functionality of a protocol stack according to a particular interface standard. For example, functionality of an overall protocol stack may be provided by first protocol stack circuitry (to function as a first constituent protocol stack) and second protocol stack circuitry which are coupled to one another via switch circuitry which is configurable to variously implement either one of an operational mode and a test mode.

The test mode may prevent communication of a data packet between the first protocol stack circuitry and the second protocol stack circuitry. By contrast, the operational mode may enable a combination of the first protocol stack circuitry and the second protocol stack circuitry to provide all of the functionality of a standard protocol stack. Such a standard protocol stack may, for example, be according to any of various Thunderbolt™ standards developed by Intel Corporation of Santa Clara, Calif., USA—e.g., according to the Thunderbolt™ 2 standard or the Thunderbolt™ 3 standard.

"Transmit protocol stack" refers herein to a stacked configuration of two more layers which facilitate the processing of signals which are to be transmitted from physical layer circuitry. "Receive protocol stack" refers herein to a stacked configuration of two more layers which facilitate the processing of signals which have been received by physical layer circuitry. "Transmit/receive protocol stack" refers herein to a combination of one transmit protocol stack and one receive protocol stack. Certain features of various embodiments are described herein with reference to an IC chip including multiple protocol stacks, each to support communication according to a protocol which is compatible with a Thunderbolt™ standard. However, such description may be extended to additionally or alternatively apply to protocol stacks which are each to support any of various other standard communication protocols.

The technologies described herein may be implemented in one or more electronic devices. Non-limiting examples of electronic devices that may utilize the technologies described herein include any kind of mobile device and/or stationary device, such as cameras, smart phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies may be employed in any of a variety of electronic devices including an IC chip having test circuitry described herein.

FIG. 1 shows features of an IC chip 100 to support circuit test functionality according to an embodiment. IC chip 100 is one example of an embodiment wherein multiple protocol stacks are each coupled between a switch fabric and other switch circuitry which is configurable to support either of an operational mode and a test mode. The operational mode may enable communication (according to a Thunderbolt™ protocol, for example) by coupling a transmit protocol stack to physical layer circuitry of the IC chip. In such an embodiment, the test mode may instead couple the transmit protocol stack to a receive protocol stack—e.g., for communication of test packet information back through the switch fabric.

In the illustrative embodiment shown, IC chip 100 includes one or more protocol adapters (e.g., including the illustrative protocol adapter PA 110 shown) and a switch fabric 120 coupled thereto. Protocol logic 130 of IC chip 100 may in turn be coupled to the one or more protocol adapters via switch fabric 120. Circuitry of switch fabric 120 may comprise any of a variety of switch network architectures to enable communication between any of the one or more protocol adapters and any of multiple protocol stacks 132, . . . , 134 of protocol logic 130. For example, the one or more protocol adapters and switch fabric 120 may variously facilitate communication between any one of protocol stacks 132, . . . , 134 and one or more other components (e.g., a processors, test controller or other logic, not shown) of IC chip 100. For example, PA 110 may perform conversion between one standard communication protocol and another standard communication protocol which is supported by protocol stacks 132, . . . , 134.

In an illustrative scenario according to one embodiment, protocol stacks 132, . . . , 134 variously support a Thunderbolt™ protocol, and the one or more protocol adapters variously support conversion each between a respective other protocol and the Thunderbolt™ protocol. By way of illustration and not limitation, PA 110 may support conversion between a Thunderbolt™ data format and one of a Peripheral Component Interconnect Express (PCIe) data format, a Universal Serial Bus (USB) data format or the like. Such conversion may include PA 110 encapsulating a PCIe (or other) packet in Thunderbolt™ header information before sending the resulting encapsulated packet to switch fabric 120. Alternatively or in addition, such conversion may include PA 110 removing Thunderbolt™ header information of a packet received from switch fabric 120, the removing to extract an PCIe (or other) packet encapsulated therein. In some embodiments, PA 110 includes test controller circuitry which itself generates a test packet and/or which functions as an endpoint for the communication of a test packet received from switch fabric 120.

In the example embodiment shown, protocol stack 132 includes transmit protocol stack circuitry to receive signals from switch fabric 120 and to process such signals. In an operational mode of IC chip, such processing may be in preparation for a communication to be transmitted with physical layer (PHY) circuitry (e.g., with a receiver and/or transmitter circuit of the illustrative PHY circuitry 160, . . . , 162 shown). Alternatively or in addition, protocol stack 134 may include receive protocol stack circuitry to receive signals from the same or other physical layer circuitry (during and operational mode), and to process such signals for providing a communication to the switch fabric 120. A single transmitter/receiver protocol stack may include protocol stacks 132, 134, for example. In another embodiment, different transmitter/receiver protocol stacks each include a respective one of protocol stacks 132, 134. Although some embodiments are not limited in this regard, one or more of protocol stacks 132, . . . , 134 may provide at least some physical layer functionality of a standard Thunderbolt™ protocol stack.

To provide a test functionality of IC chip 100, switch logic 140 may be configured to variously enable coupling of any of protocol stacks 132, . . . , 134 to respective PHY circuitry that includes or otherwise provides access to transmitter and/or receiver (Tx/Rx) functionality. By way of illustration and not limitation, PHY circuitry 160 and PHY circuitry 162 may each include, or provide access to, respective Tx/Rx circuits configured to drive or sense, respectively, various analog communications to/from IC chip 100. Switch logic 140 may comprise circuitry that is configurable to selectively allow or prevent access to one or more of PHY circuitry 160, . . . , 162 by some or all of protocol stacks 132, . . . , 134. For example, one or more functional units of switch logic 140 may be operable to selectively reroute a packet from communication via a signal path that would otherwise be used when an operational mode of switch logic 140 is configured. In this context, "signal path" refers herein to one or more conductive traces—e.g., including a bus—which enable at least one of serial communication and parallel communication from a source to a destination.

In the example embodiment shown, switch logic 140 includes switch components (e.g., such as the illustrative switch components SC 142, . . . , SC 144 shown) each coupled to a respective one of protocol stacks 132, . . . , 134. Such switch components 142, . . . , 144 may be variously configurable (e.g., reconfigurable) to any of a plurality of modes including an operational mode and a test mode. A control signal 146 may, for example, be provided by a test controller, host processor or other agent (not shown) of IC chip 100 to selectively configure the test mode or the operational mode.

By way of illustration and not limitation, SC 142 may include multiplexer (MUX) circuitry to selectively couple an output of protocol stack 132 to either of two signal paths 152, 154. In such an embodiment, an operational mode of switch logic 140 may include signal path 152 being selected for coupling of protocol stack 132 to PHY circuitry 160, for example. By contrast, a test mode of switch logic 140 may include signal path 154 being selected to instead facilitate coupling of protocol stack 132 to another protocol stack of protocol logic 130 (such as the illustrative protocol stack 134 shown).

For example, SC 144 may include demultiplexer (DMUX) circuitry to selectively couple an input to protocol stack 134 to either of two signal paths 156, 158. In such an embodiment, the operational mode of switch logic 140 may also include signal path 156 being selected to couple protocol stack 132 to a receiver circuit of one of PHY circuitry 160, ..., PHY circuitry 162. However, the test mode of switch logic 140 may further include signal path 158 being selected to instead couple protocol stack 134 to SC 142.

In an illustrative scenario according to one embodiment, configuration of the test mode selects signal path 154 to enable communication of a first packet from protocol stack 132 to a component (such as the illustrative packet module 150) that is processes the first packet in preparation for a subsequent communication with protocol stack 134. Such packet processing may include generating a second packet based on the first packet—e.g., wherein the second packet, according to a Thunderbolt™ protocol, represents a reply to the first packet.

In some embodiments, packet module 150 further provides accumulator functionality to collect signature information representing a state of the first packet (and/or state of the second packet) at switch logic 140. Such signature information may be communicated to a test controller (not shown) or other agent of IC chip 100 for use in evaluating the performance of circuitry which participated in communication of the first packet to SC 142. For example, signature information may be compared to fiducial reference data which corresponds to the performance of known-good circuitry. Although represented as residing in SC 142, packet module 150 may instead be disposed between SC 142 and SC 144, or disposed in SC 144, for example.

Figure 2:
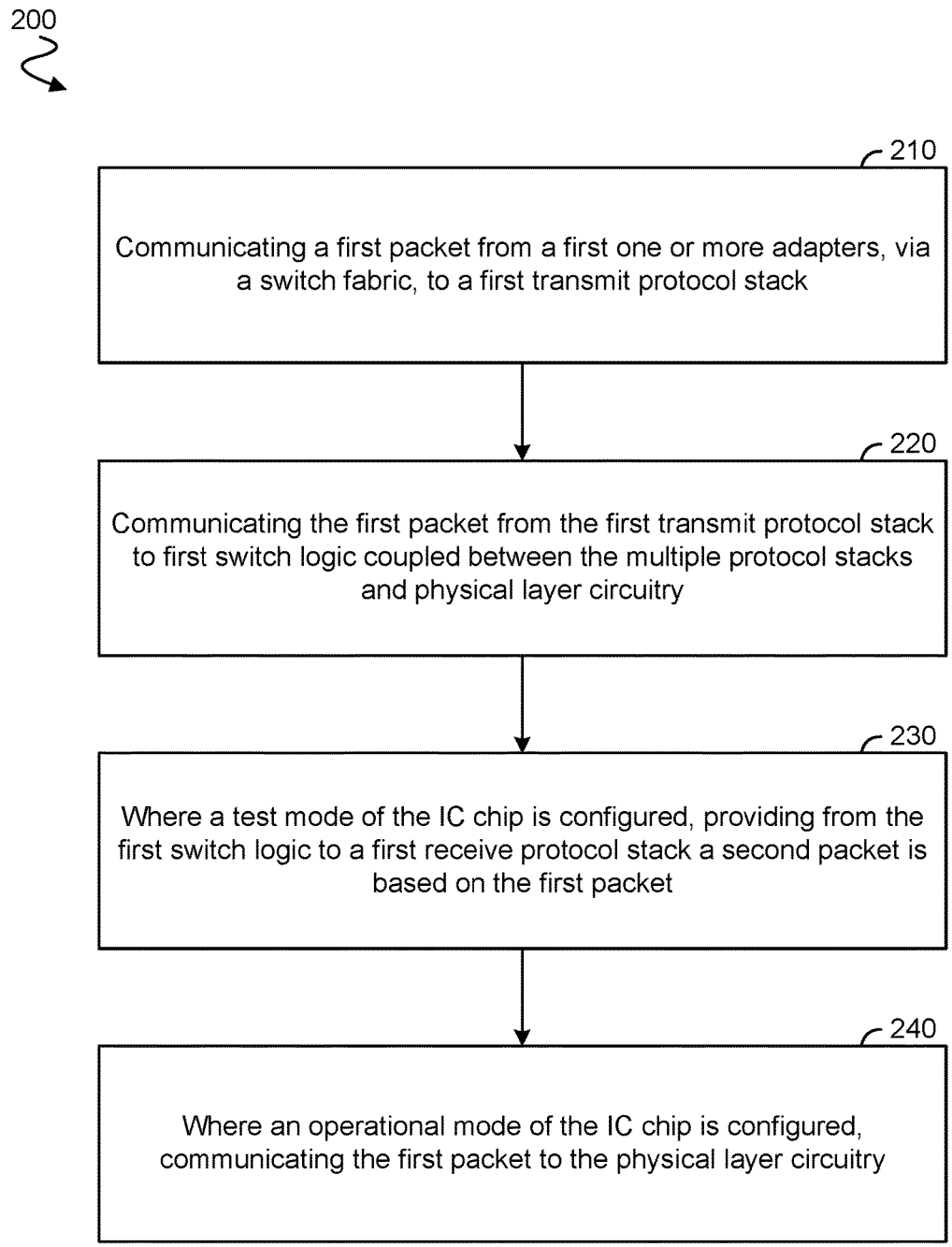
FIG. 2 is a flow diagram illustrating elements of a method for testing integrated circuitry according to an embodiment.

FIG. 2 shows features of a method to be performed at an IC chip according to an embodiment. Method 200 may be performed with circuitry having features of IC chip 100, for example. In the example embodiment shown, method 200 includes, at 210, communicating a first packet from a first one or more adapters, via a switch fabric, to a first transmit protocol stack. The first transmit protocol stack may be one of multiple protocol stacks which are each coupled to first one or more adapters via the switch fabric.

Such protocol stacks may, for example, each provide transport layer functionality and logical layer functionality of a standard (e.g., Thunderbolt™) protocol stack. In some embodiments, one or more protocol stacks include at least some physical layer functionality—e.g., wherein the first transmit protocol stack further provides some electric layer functionality. Although some embodiments are not limited in this regard, one or more of the multiple protocol stacks may omit at least some physical layer functionality which is part of a standard protocol stack—e.g., one according to a Thunderbolt™ (or other) standard. For example, the multiple protocol stacks may include a transmit protocol stack which omits any digital-to-analog circuitry and/or a receive protocol stack which omits any analog-to-digital circuitry.

The communicating at 210 may, for example, include sending the first packet from the one or more protocol adapters of IC chip 100 (e.g., from PA 110) to protocol stack 132 via switch fabric 120. In an embodiment, the first one or more adapters each correspond to a different respective protocol (e.g., a different respective one of a PCIe protocol, a USB protocol, a DisplayPort or the like). In such an embodiment, method 200 may further comprise, for each adapter of the first one or more adapters, the adapter performing a respective conversion between the corresponding protocol and a first protocol (e.g., compatible with a Thunderbolt™ standard), wherein the multiple protocol stacks are each to facilitate communication according to the first protocol. For example, method 200 may further include performing a packet conversion (before the communicating at 210) to generate the first packet by encapsulating other packet data in Thunderbolt™ (or other) header information. Such encapsulated (or otherwise converted) packet data may have been previously received by the first one or more adapters from a test controller of the IC chip. In other embodiments, method 200 further performs one of the first one or more adapters generating the first packet internally, with test circuitry thereof.

Method 200 may further comprise, at 220, communicating the first packet from the first transmit protocol stack to first switch logic which is coupled between the multiple protocol stacks and physical layer circuitry. For example, the communicating at 220 may include protocol stack 132 outputting the first packet to SC 142. Where a test mode of the IC chip is configured, method 200 may, at 230, provide a second packet from the first switch logic to a first receive protocol stack of the multiple protocol stacks, wherein the second packet is based on the first packet. For example, method 200 may further comprise operations (not shown) to generate the second packet based on the first packet—e.g., wherein the second packet represents a reply to the first packet. In the example embodiment of IC chip 100, the second packet may then be communicated at 230 from switch logic 140 to protocol stack 134—e.g., where the second packet (or other packet information based on the second packet) is eventually communicated from protocol logic 130 via switch fabric 120 to PA 110 (or another of the one or more adapters). To facilitate performance testing, the first switch logic (e.g., switch logic 140) may further accumulate signature information based on the first packet, in some embodiments.

In some embodiments, the test mode results in operations of method 200 which facilitate the testing of more than two protocol stacks. For example, the second packet data may be based on packet information which is variously communicated through others of the multiple protocol stacks after communication of the first packet through the first transmit protocol stack. Alternatively, further operations (not shown) based on a configuration of the test mode may include communicating packet information—e.g., the second packet or another packet generated based on the second packet—from the first receive protocol stack to a second transmit protocol stack. Such communicating of packet information may take place via the switch fabric or, alternatively, via second switch circuitry which is coupled between the switch fabric and the multiple protocol stacks—e.g., wherein the communicating is performed independent of any of the first one or more adapters. Based on the test mode, the first switch logic may receive the packet information as an output from the second transmit protocol stack and—based on the packet information—send the same packet information (or related packet information derived therefrom) to an input of a second receive protocol stack. In this manner, test packet information may be variously communicated through a sequence of the multiple protocol stacks to facilitate the testing and evaluation of protocol stack performance.

The communicating the first packet to the first transmit protocol stack at 210 may, for example, include communicating the first packet from a first adapter of the first one or more adapters. In such an embodiment, method 200 may further comprise communicating the second packet—based on the test mode—from the multiple protocol stacks (e.g. from the first receive protocol stack) to the first adapter via the switch fabric. Alternatively, the second packet (or other packet information based thereon) may be provided via the switch fabric to some other adapter of the first one or more adapters.

Where an operational mode of the IC chip is configured, method 200 may, at 240, perform operations including communicating the first packet to the physical layer circuitry. Such operations may further comprise communicating the first packet from the IC chip with the physical layer circuitry.

Figure 3:
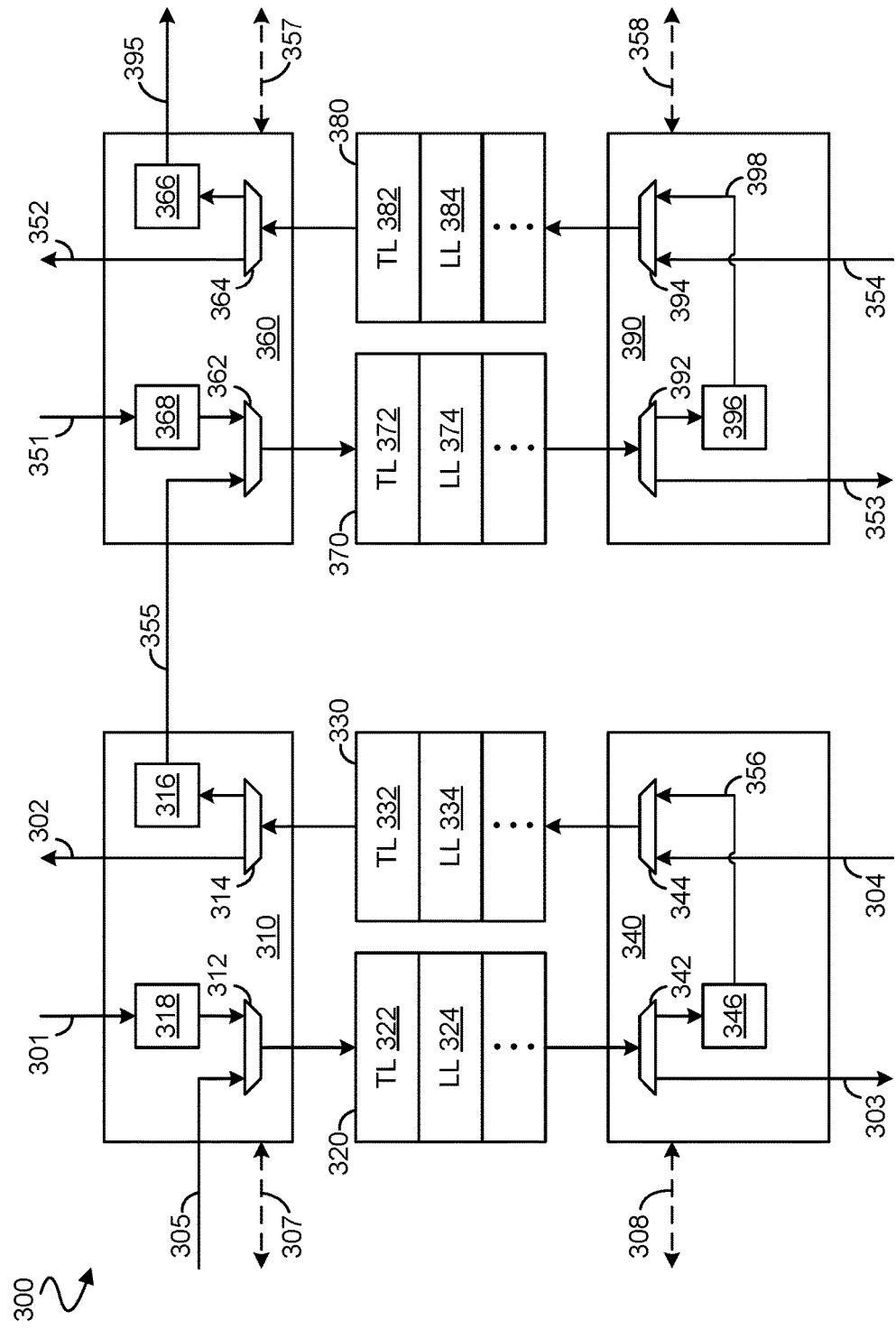
FIG. 3 is a functional block diagram illustrating elements of circuitry to facilitate testing of protocol stacks according to an embodiment.

FIG. 3 shows features of an IC chip 300 to provide on-chip test functionality according to an embodiment. IC chip 300 may have features of IC chip 100, for example. In an embodiment, method 200 is performed with circuitry of IC chip 300.

IC chip 300 is one example of an embodiment wherein multiple protocol stacks are coupled between first switch logic and a switch fabric, wherein the first switch circuitry is to selectively implement, at least in part, either of an operational mode of IC chip 300 and a test mode of IC chip 300. The operational mode may enable communication, via the first switch logic, between a first protocol stack and PHY circuitry. The test mode may switchedly decouple such PHY circuitry from the first protocol stack—e.g., wherein the first protocol stack is instead coupled to communicate with a second protocol stack.

In the example embodiment shown, IC chip 300 includes transmit protocol stacks 320, 370 and receive protocol stacks 330, 380 each coupled between first switch circuitry (comprising switch components 340, 390) and a switch fabric (not shown). The multiple protocol stacks 320, 330, 370, 380 may, for example, be coupled to the switch fabric via second switch logic comprising the illustrative switch components 310, 360 shown. In another embodiment, some or all of the functionality of switch components 310, 360 is instead implemented by circuitry of the switch fabric itself.

Some or all protocol stacks of IC chip 300 may, for example, include respective transport layer circuitry (TL) and logical layer circuitry (LL) to provide the functionality of standard Thunderbolt™ protocol stack's transport layer and logical layer. Transport layer functionality may comprise packet formatting, quality of service (QoS) support and/or flow control, for example. Logical layer functionality may include scrambling/descrambling, encoding/decoding or the like. By way of illustration and not limitation, transmit protocol stack 320 may include transport layer circuitry (TL) 322 and logical layer circuitry (LL) 324—e.g., where receive protocol stack 330 includes TL 332 and LL 334. Additionally or alternatively, transmit protocol stack 370 may include TL 372 and LL 374—e.g., wherein receive protocol stack 380 includes TL 382 and LL 384. In some embodiments, a protocol stack of IC chip 300 supports at least some physical layer functionality—e.g., including signal jitter mitigation, power management and/or the like.

Switch component 340 may include DMUX circuitry 342 to select between signal paths 303, 356 and MUX circuitry 344 to select between signal paths 304, 356. Alternatively or in addition, switch component 390 may include DMUX circuitry 392 to select between signal paths 353, 398 and MUX circuitry 394 to select between signal paths 354, 398. Signal paths 303, 353 may function to variously provide access to one or more transmitters of PHY layer circuitry (not shown)—e.g., wherein signal paths 304, 354 function to provide access to one or more receivers of such PHY layer circuitry. In such an embodiment, switch component 310 may include MUX circuitry 312 to select between signal paths 301, 305 and DMUX circuitry 314 to select between signal paths 302, 355. Alternatively or in addition, switch component 360 may include MUX circuitry 362 to select between signal paths 351, 355 and DMUX circuitry 364 to select between signal paths 352, 395. Signal paths 301, 351 may variously receive data packets from the switch fabric— e.g., wherein signal paths 302, 352 provide for communication of data packets to the switch fabric.

Control signal paths 307, 308, 357, 358 may variously provide for communication of one or more control signals to selectively configure one of a test mode or an operational mode with some or all of switch components 310, 340, 360, 390. In one example embodiment, configuring the operational mode may include MUX circuitry 312, 344 selecting respective signal paths 301, 304 and DMUX circuitry 314, 342 selecting respective signal paths 303, 302. Alternatively or in addition, configuring the operational mode may include MUX circuitry 362, 394 selecting respective signal paths 351, 354 and DMUX circuitry 364, 392 selecting respective signal paths 353, 352

Configuring the test mode may, for example, include MUX circuitry 344 selecting signal path 356 as an input and DMUX circuitry 342 selecting signal path 356 as an output. In one such embodiment, configuring the test mode may further comprise MUX circuitry 362, 394 selecting signal paths 355, 398 as respective inputs and DMUX circuitry 314, 392 selecting signal paths 355, 398 as respective outputs. Where, for example, transmit protocol stack 320 is to be the first protocol stack to receive a given test packet from the switch fabric, the test mode may configure MUX circuitry 312 to select signal path 301. Alternatively, the test mode may configure MUX circuitry 312 to select signal path 305—e.g., in an embodiment where transmit protocol stack 320 is instead to receive test packet information from another protocol stack. Alternatively or in addition, the test mode may configure DMUX circuitry 364 to select signal path 352, where receive protocol stack 380 is to be the last in a sequence of protocol stacks to communicate test packet information. In another embodiment, the test mode may instead configure DMUX circuitry 364 to select signal path 395—e.g., where another protocol stack (not shown) is to further communicate additional test packet information based on one or more test packets variously communicated with protocol stacks 320, 330, 370, 380.

The first switch logic and second switch logic may provide functionality to perform test packet processing—e.g., to generate, based on a first test packet a second test packet which, for example, represents a reply to the first test packet. In one example embodiment, signal path 356 may include or be coupled to a packet module 346 which is to process a test packet received via MUX circuitry 342 from transmit protocol stack 320. Alternatively or in addition, signal path 398 may include or be coupled to a packet module 396 which is to process a test packet received via DMUX circuitry 392 from transmit protocol stack 370.

The first switch logic and second switch logic may additionally or alternatively provide functionality to accumulate signature data based on test information which is communicated to, and through, multiple protocol stacks. For example, an accumulator 318 of switch component 310 may gather signature information based on a test packet received via signal path 301—e.g., wherein an accumulator 316 of switch component 310 is to additionally or alternatively gather signature information based on a test packet received via DMUX circuitry 314. In some embodiment, an accumulator 368 of switch component 360 may gather signature information based on a test packet received via signal path 351—e.g., wherein an accumulator 366 of switch component 360 is to additionally or alternatively gather signature information based on a test packet received via DMUX circuitry 364.

Figure 4:
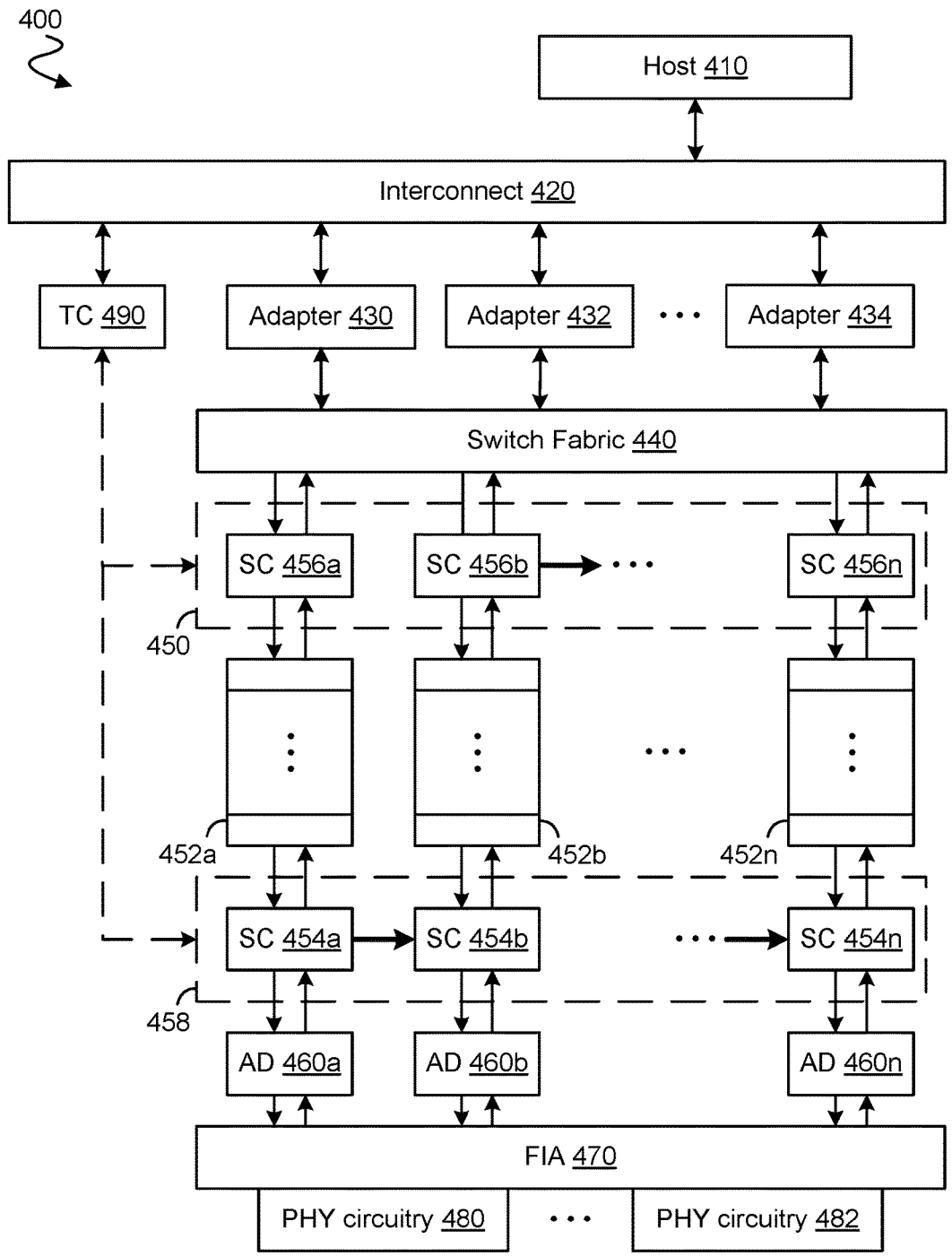
FIG. 4 is a functional block diagram illustrating elements of an integrated circuit chip to test protocol logic according to an embodiment.

FIG. 4 illustrates elements of an IC chip 400 to provide test and/or debug functionality according to an embodiment.

IC chip 400 may include features of one of IC chips 100, 300—e.g., wherein circuitry of IC chip 400 is to perform operations of method 200. IC chip 400 may provide functionality of a system-on-chip (SoC) wherein a host 410 of IC chip 400—e.g., the host 410 including one or more processor cores—is coupled to direct of otherwise control operation of other functional components of IC chip 400. Host 410 may include a processor to execute an operating system, for example. Functional components to be controlled by host 410 may comprise one or more of a memory, input/output hub, memory controller, bus and/or any of a variety of other resources of IC chip 400. In the particular context of a host of an IC chip which controls another resource of that same IC chip, "device" is used herein to refer to the other resource which is so controlled.

Host 410 may be coupled to a device (or devices) of IC chip 400 via one or more buses and/or other interconnect structures, which are represented in FIG. 4 by the illustrative interconnect 420 shown. Such interconnect structures may support media access control (MAC) communication mechanisms, PCIe communication mechanisms, USB communication mechanisms and/or the like. However, the particular number and arrangement of such buses or other interconnect structures may vary according to implementation-specific details, and are not limiting on some embodiments.

In the illustrative embodiment shown, IC chip 400 includes physical layer circuitry (e.g., comprising the illustrative PHY circuitry 480, ..., PHY circuitry 482 shown) to provide access between some or all resources of IC chip 400—e.g., including host 410—and other resources (not shown) that are to be coupled via such physical layer circuitry. Such other resources may be distinct from IC chip 400, although some embodiments are not limited in this regard. Some or all of PHY circuitry 480, ..., PHY circuitry 482 may each include a respective transmitter block and/or a respective receiver block to variously transmit or receive analog signals. For example, PHY circuitry 480 may include an analog front end (AFE) with which IC chip 400 is to variously receive or output analog communications. Operation of PHY circuitry 480, ..., PHY circuitry 482 may be compatible with a high-speed serial interface standard, where "high-speed"—in this context—refers to support for a data rate of 10 Gbps or more and, in some embodiments, 20 Gbps or more. For example, the high-speed serial interface standard may be one that is according to a Thunderbolt™ 2 standard or a Thunderbolt™ 3 standard.

To facilitate access to host 410, PHY circuitry 480, ..., PHY circuitry 482 may be variously coupled to interconnect 420 via first one or more adapters (such as the illustrative adapters 430, 432, ..., 434 shown), flexible input/output adapter (FIA) 470, second one or more adapters (such as the illustrative adapters AD 460a, AD 460b, ..., AD 460n shown), multiple transmit/receive protocol stacks 452a, 452b, ..., 452n and a switch fabric 440. To provide test functionality of IC die 400, first switch circuitry 458 may be coupled between protocol stacks 452a, 452b, ..., 452n and FIA 470—e.g., wherein second switch circuitry 450 is coupled between protocol stacks 452a, 452b, ..., 452n and switch fabric 440.

Switch circuitry 458 and switch circuitry 450 may provide functionality of the first switch logic and the second switch logic, respectively of IC die 300. For example, switch components SC 454a, 454b, ..., 454n of switch circuitry 458 may variously provide functionality of switch components 340, 390. In such an embodiment, switch components SC 456a, 456b, ..., 456n of switch circuitry 450 may variously provide functionality of switch components 310, 360. Switch circuitry 458 and switch circuitry 450 may be variously configurable to implement either of an operational mode and a test mode. For example, a test controller TC 490 may variously signal switch circuitry 450 and switch circuitry 458 to selectively decouple a protocol stack from physical layer circuitry and to couple the protocol stack to another protocol stack. The operational mode may couple one of more of protocol stacks 452a, 452b, ..., 452n each to FIA 470 via a respective one of AD 460a, 460b, ..., 460n. The test mode may instead configure switch circuitry 450 (and switch circuitry 458, in some embodiments) to enable communication at least between one transmit protocol stack of protocol stacks 452a, 452b, ..., 452n and one receive protocol stack of protocol stacks 452a, 452b, ..., 452n.

Figure 5:
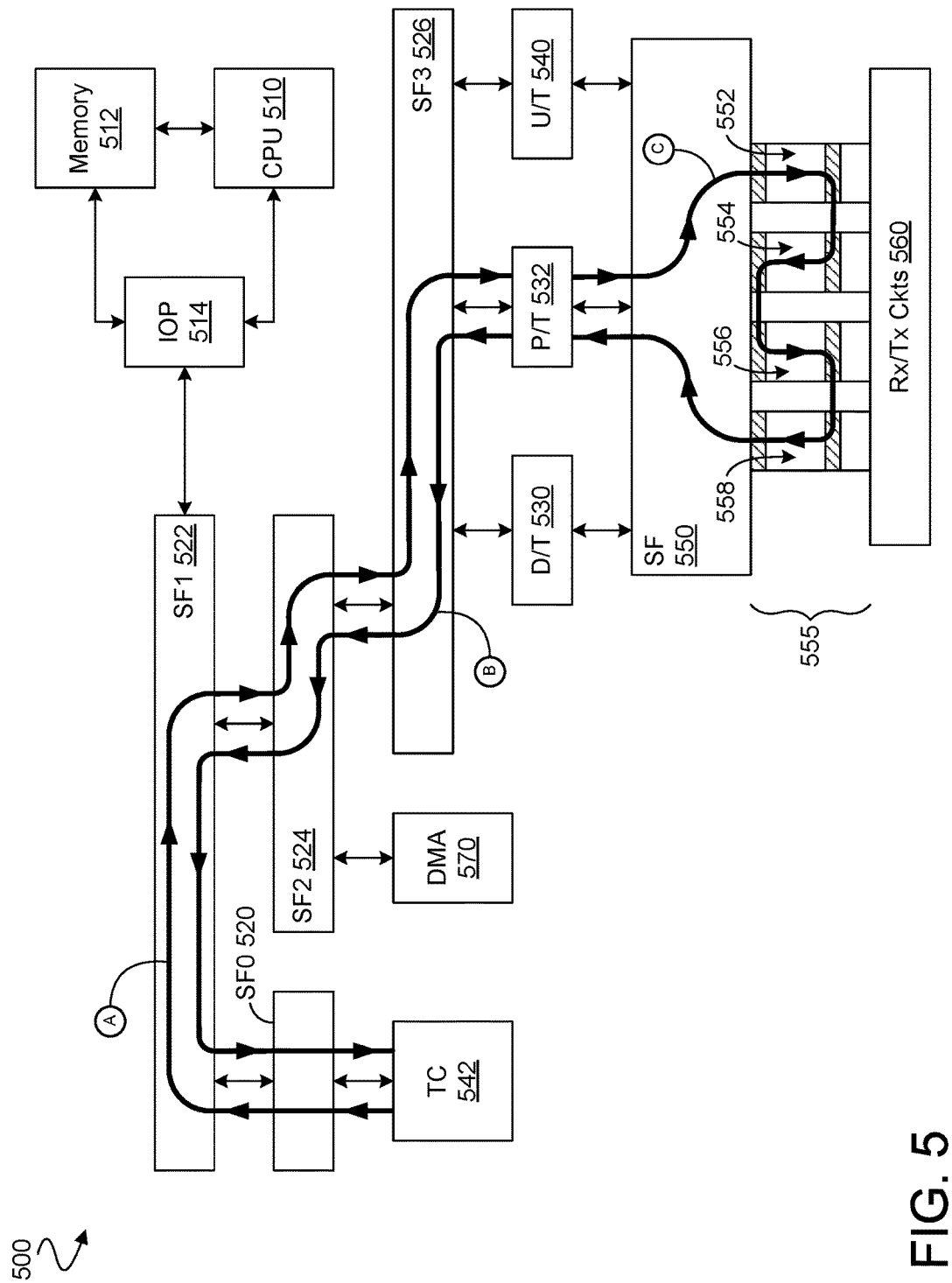
FIG. 5 is a functional block diagram illustrating elements of an integrated circuit chip to test integrated circuitry according to an embodiment.

FIG. 5 illustrates elements an IC chip 500 to provide on-chip test functionality according to an embodiment. IC chip 500 may include features of one of IC chips 100, 300, 400, for example—e.g., where IC chip 500 is configured to perform method 200. In the illustrative embodiment shown, IC chip 500 includes a central processing unit (CPU) 510, switch fabric SF 550 and test controller TC 542 which, respectively, correspond functionally to host 410, switch fabric 440 and TC 490. Thunderbolt™ protocol stacks—e.g., including protocol stacks 552, 554, 556, 558—may be coupled between SF 550 and physical layer circuitry of IC chip 500 (such as the illustrative Rx/Tx circuits 560 shown).

IC chip 500 may include devices to be variously controlled directly or indirectly by one or more host processes executed with CPU 510. By way of illustration and not limitation, such devices may include a memory 512, input/output processor IOP 514, and direct memory access circuitry DMA 570. However, IC chip 500 may include more, fewer and/or different devices to be controlled by CPU 510, in different embodiments.

An interconnect architecture (e.g., corresponding functionally to interconnect 420) may variously couple CPU 510 and devices of IC chip 500 to Rx/Tx circuits 560. Such an interconnect architecture may include, for example, one or more scalable fabrics such as the illustrative scalable fabrics SF0 520, SF1 522, SF2 524 and SF3 526 shown. The particular number and configuration of such one or more scalable fabrics may vary in different embodiments.

The interconnect architecture may be coupled to SF 550 via one or more protocol adapters. By way of illustration and not limitation, an adapter D/T 530 may support conversion between a DisplayPort protocol and a Thunderbolt™ protocol—e.g., wherein an adapter P/T 532 supports conversion between a PCIe protocol and the Thunderbolt™ protocol and/or an adapter U/T 540 supports conversion between a USB protocol and the Thunderbolt™ protocol.

To provide on-chip test functionality, first switch circuitry may be coupled between protocol stacks 552, 554, 556, 558 and Rx/Tx circuits 560—e.g., wherein second switch circuitry is coupled between protocol stacks 552, 554, 556, 558 and switch fabric 550. Such switch circuitry may variously implement, at least in part, an operational mode of IC chip 500 and a test mode of IC chip 500. During the test mode, TC 542 may initiate a communication A of a test packet through the interconnect architecture to an adapter (e.g., P/T 532). The adapter may convert a format of the test packet into a Thunderbolt™ format, where the converted test packet is sent as part of a communication C via switch fabric 550 to one of protocol stacks 552, 554, 556, 558. Based on the test mode of IC chip 500, the first switch circuitry and second switch circuitry may variously communicate test packet information among different ones of protocol stacks 552, 554, 556, 558—e.g., independent of any communication between protocol stacks 552, 554, 556, 558 and Rx/Tx circuits 560. Based on such communication, one of protocol stacks 552, 554, 556, 558 may output test packet information via SF 550 to P/T 532. In an embodiment, a communication C between P/T 532 and TC 542 may include a converted version of test packet information.

Figure 6:
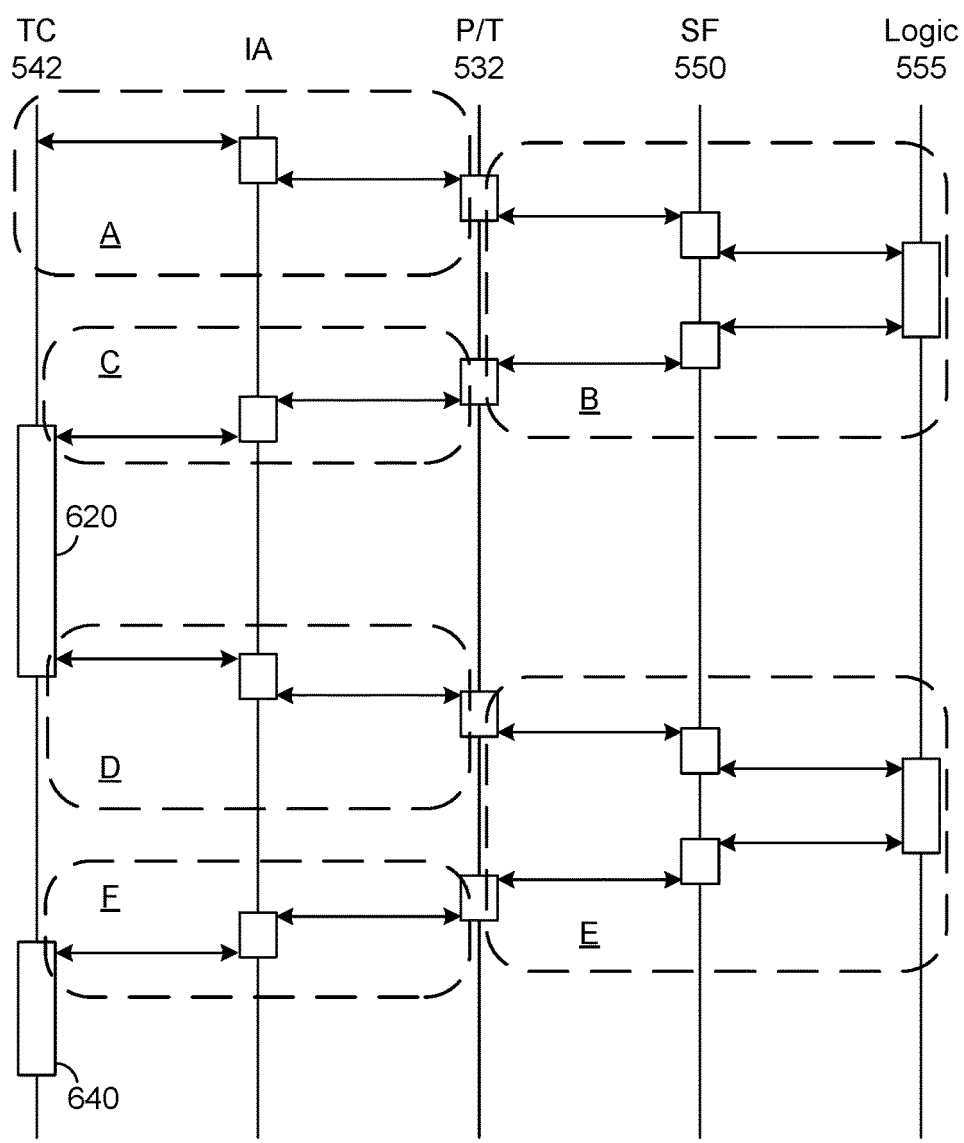
FIG. 6 is a swim-lane diagram illustrating elements of a communication sequence to provide test functionality according to an embodiment.

FIG. 6 shows an exchange 600 to facilitate test functionality according to an embodiment. Exchange 600 may include operations of method 200, for example. To illustrate certain features of various embodiments, exchange 600 is shown as taking place with resources of IC chip 500. However, other exchanges may be similarly performed at one of IC chips 100, 300, 400.

In the illustrative embodiment shown in FIG. 6, exchange 600 includes communication A to provide a test packet from TC 542 to P/T 532 via the interconnect architecture IA which comprises SF0 520, SF1 522, SF2 524 and SF3 526. To prepare for communication B, P/T 532 may convert the test packet to a Thunderbolt™ format from another format (such as a PCIe format or a USB format). In such an embodiment, the communication B may send the converted test packet, via SF 550, to logic 555 which (for example) comprises protocol stacks 552, 554, 556, 558 and switch logic which is configured to provide a test mode. Based on communication and processing of the converted test packet, protocol stacks 552, 554, 556, 558 may return test information to P/T 532 (or another protocol adapter) via SF 550. Such test information may then be converted at P/T 532 to generate reformatted test information which, in Communication C, is provided to TC 542.

In some embodiments, exchange 600 further comprises another sequence of communications D, E, F which, for example, are reciprocal to the sequence of communications A, B, C. In communication D, TC 542 may send a reply test packet via the interconnect architecture IA to a protocol adapter such as P/T 532. The reply test packet may be generated, for example, based on processing 620 of the test information returned to TC 542 by communication C.

To prepare for communication E, P/T 532 may convert the reply test packet to a Thunderbolt™ format, where communication E sends the converted reply test packet, via SF 550, to logic 555. Based on the test mode of IC chip 500, communication and processing of the converted reply test packet may result in protocol stacks 552, 554, 556, 558 returning test information to P/T 532 via SF 550. Such test information may then be converted at P/T 532 to generate reformatted test information which, in Communication F, is provided to TC 542. An evaluation 640 of such test information by TC 542—e.g., the evaluation based on known-good reference signature information—may determine performance characteristics of logic 555 (and/or other circuitry involved in communications A-F).

Figure 7:
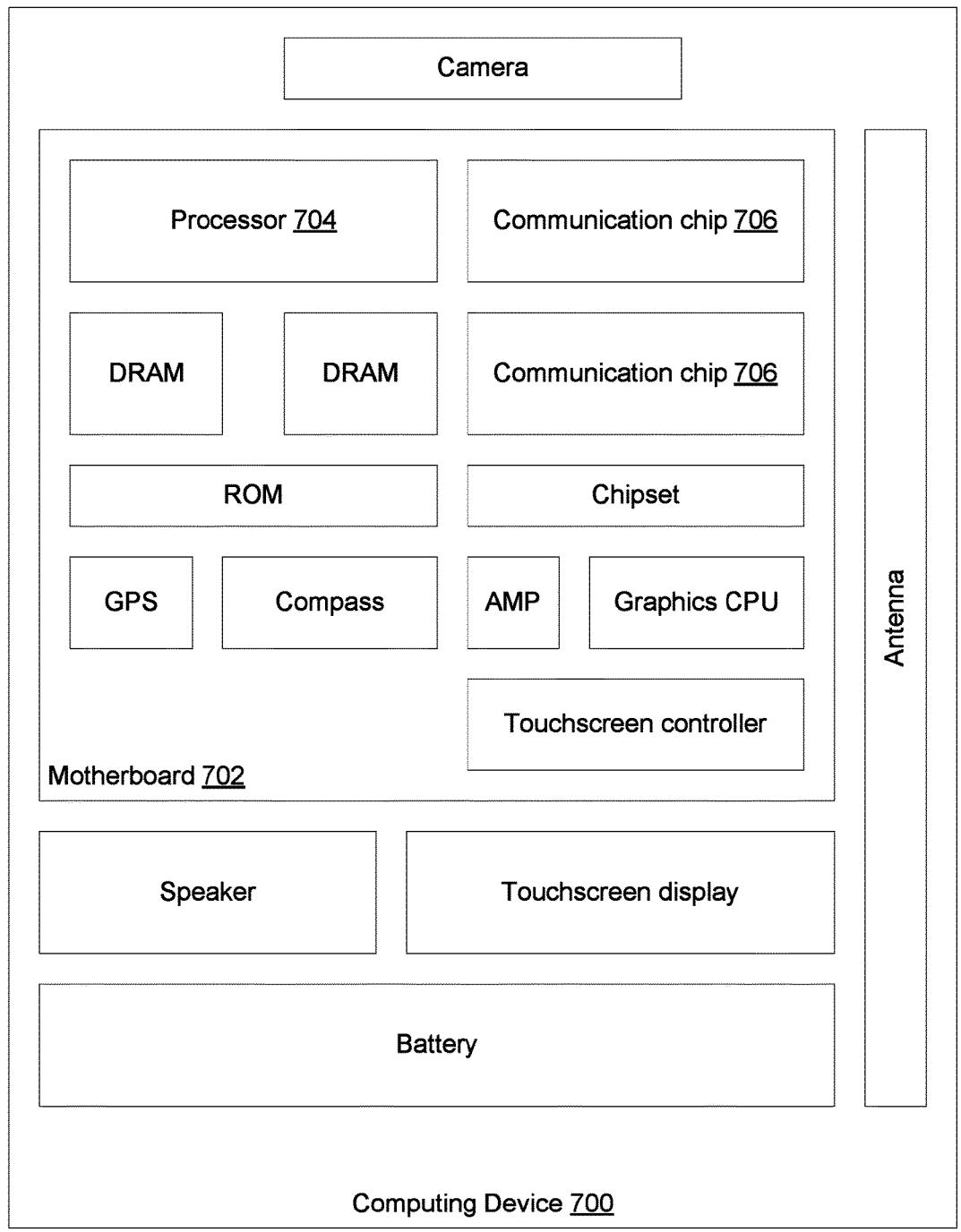
FIG. 7 is a functional block diagram illustrating elements of a computing device according to an embodiment.

FIG. 7 illustrates a computing device 700 in accordance with one embodiment. The computing device 700 houses a board 702. The board 702 may include a number of components, including but not limited to a processor 704 and at least one communication chip 706. The processor 704 is physically and electrically coupled to the board 702. In some implementations the at least one communication chip 706 is also physically and electrically coupled to the board 702. In further implementations, the communication chip 706 is part of the processor 704.

Depending on its applications, computing device 700 may include other components that may or may not be physically and electrically coupled to the board 702. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 706 enables wireless communications for the transfer of data to and from the computing device 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 706 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 700 may include a plurality of communication chips 706. For instance, a first communication chip 706 may be dedicated to shorter range wireless communications such as Wi-Fi and Bluetooth and a second communication chip 706 may be dedicated to longer range wireless communications such as GPS, EDGE, GPRS, CDMA, WiMAX, LTE, Ev-DO, and others.

The processor 704 of the computing device 700 includes an integrated circuit die packaged within the processor 704. The term "processor" may refer to any device or portion of a device that processes electronic data from registers and/or memory to transform that electronic data into other electronic data that may be stored in registers and/or memory. The communication chip 706 also includes an integrated circuit die packaged within the communication chip 706.

In various implementations, the computing device 700 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 700 may be any other electronic device that processes data.

Some embodiments may be provided as a computer program product, or software, that may include a machine-readable medium having stored thereon instructions, which may be used to program a computer system (or other electronic devices) to perform a process according to an embodiment. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

Figure 8:
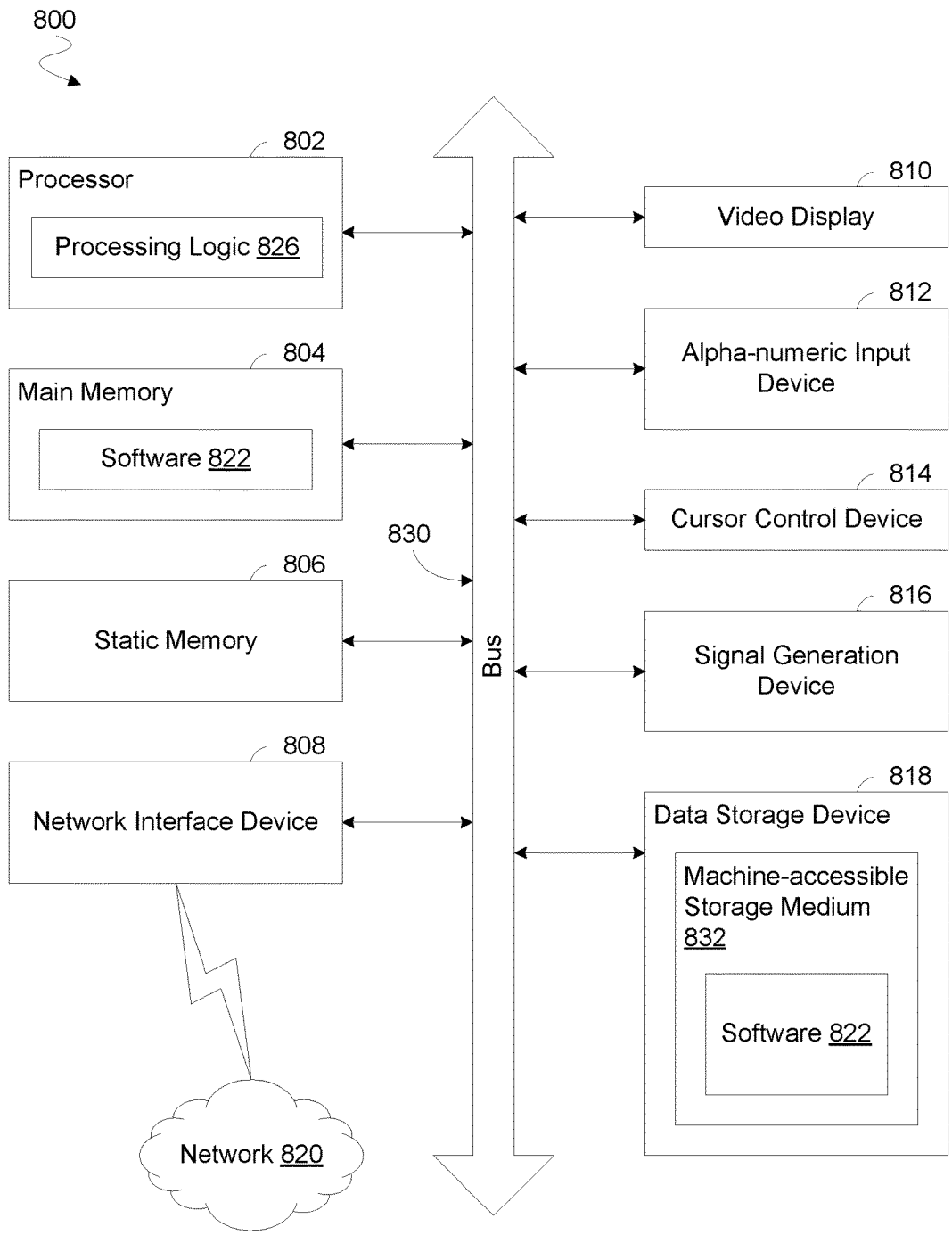
FIG. 8 is a functional block diagram illustrating elements of a computer system according to an embodiment.

FIG. 8 illustrates a diagrammatic representation of a machine in the exemplary form of a computer system 800 within which a set of instructions, for causing the machine to perform any one or more of the methodologies described herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies described herein.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 818 (e.g., a data storage device), which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations described herein.

The computer system 800 may further include a network interface device 808. The computer system 800 also may include a video display unit 810 (e.g., a liquid crystal display (LCD), a light emitting diode display (LED), or a cathode ray tube (CRT)), an alphanumeric input device 812 (e.g., a keyboard), a cursor control device 814 (e.g., a mouse), and a signal generation device 816 (e.g., a speaker).

The secondary memory 818 may include a machine-accessible storage medium (or more specifically a computer-readable storage medium) 832 on which is stored one or more sets of instructions (e.g., software 822) embodying any one or more of the methodologies or functions described herein. The software 822 may also reside, completely or at least partially, within the main memory 804 and/or within the processor 802 during execution thereof by the computer system 800, the main memory 804 and the processor 802 also constituting machine-readable storage media. The software 822 may further be transmitted or received over a network 820 via the network interface device 808.

While the machine-accessible storage medium 832 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any of one or more embodiments. The term "machine-readable storage medium" shall accordingly be taken to include, but not be limited to, solid-state memories, and optical and magnetic media.

In one implementation, an integrated circuit (IC) chip comprises a first one or more adapters, a switch fabric coupled to the first one or more adapters, and protocol stacks each coupled to the switch fabric, the protocol stacks including a first transmit protocol stack to receive via the switch fabric a first packet from the first one or more adapters, and a first receive protocol stack. The IC chip further comprises first switch logic coupled to the multiple protocol stacks, the first switch logic to receive the first packet from the first transmit protocol stack, wherein, where a test mode of the IC chip is configured, the first switch logic to provide to the first receive protocol stack a second packet based on the first packet, and physical layer circuitry coupled to the multiple protocol stacks via the first switch logic, wherein, where an operational mode of the IC chip is configured, the first switch logic to communicate the first packet to the physical layer circuitry.

In one embodiment, where the operational mode of the IC chip is configured, the physical layer circuitry is to transmit the first packet from the IC chip. In another embodiment, the first one or more adapters each correspond to a different respective protocol, wherein, for each of the first one or more adapters, the adapter is to perform a respective conversion between the corresponding protocol and a first protocol, wherein the protocol stacks are each to facilitate communication according to the first protocol. In another embodiment, the first protocol is compatible with a Thunderbolt™ specification. In another embodiment, the protocol stacks each include a respective transport layer and a respective logical layer. In another embodiment, the first one or more adapters include a first adapter to provide the first packet to the switch fabric and to receive the second packet from the switch fabric. In another embodiment, the protocol stacks further include a second transmit protocol stack and a second receive protocol stack, wherein the IC chip further comprises second switch logic coupled between the switch fabric and the protocol stacks, wherein, where the test mode of the IC chip is configured, the second switch logic is to provide the second packet to the second transmit protocol stack, the first switch component is to receive the second packet from the second transmit protocol stack, and the first switch component is to provide to the second receive protocol stack a third packet based on the second packet. In another embodiment, the first one or more adapters comprise a first adapter including test circuitry to generate the first packet. In another embodiment, the apparatus further comprises an interconnect, and a test controller coupled to the first one or more adapters via the interconnect, the test controller to perform an evaluation of the IC chip based on the second packet.

In another implementation, a method at an integrated circuit (IC) chip, the method comprises communicating a first packet from a first one or more adapters, via a switch fabric, to a first transmit protocol stack of multiple protocol stacks each coupled to first one or more adapters via the switch fabric, and communicating the first packet from the first transmit protocol stack to first switch logic coupled between the multiple protocol stacks and physical layer circuitry. The method further comprises, where a test mode of the IC chip is configured, providing a second packet from the first switch logic to a first receive protocol stack of the multiple protocol stacks, wherein the second packet is based on the first packet, and where an operational mode of the IC chip is configured, communicating the first packet to the physical layer circuitry, and communicating the first packet from the IC chip with the physical layer circuitry.

In one embodiment, the first one or more adapters each correspond to a different respective protocol, wherein the method further comprises, for each of the first one or more adapters, the adapter performing a respective conversion between the corresponding protocol and a first protocol, wherein the protocol stacks are each to facilitate communication according to the first protocol. In another embodiment, the first protocol is compatible with a Thunderbolt™ specification. In another embodiment, the protocol stacks each include a respective transport layer and a respective logical layer. In another embodiment, communicating the first packet to the first transmit protocol stack includes communicating the first packet from a first adapter of the first one or more adapters, the method further comprises communicating the second packet from the multiple protocol stacks to the first adapter via the switch fabric. In another embodiment, the method further comprises communicating the second packet from the first receive protocol stack to second switch logic coupled between the multiple protocol stacks and the switch fabric, and, where the test mode of the IC chip is configured, providing the second packet from the second switch logic to a second transmit protocol stack of the multiple protocol stacks, communicating the second packet from the second transmit protocol stack to the first switch component, and providing a third packet from the first switch component to a second receive protocol stack of the multiple protocol stacks, the third packet based on the second packet. In another embodiment, the method further comprises generating the first packet with test circuitry of the first one or more adapters.

In another implementation, a system comprises an integrated circuit (IC) chip comprising a first one or more adapters, a switch fabric coupled to the first one or more adapters, protocol stacks each coupled to the switch fabric, the protocol stacks including a first transmit protocol stack to receive via the switch fabric a first packet from the first one or more adapters, and a first receive protocol stack. The IC chip further comprises first switch logic coupled to the multiple protocol stacks, the first switch logic to receive the first packet from the first transmit protocol stack, wherein, where a test mode of the IC chip is configured, the first switch logic to provide to the first receive protocol stack a second packet based on the first packet, and physical layer circuitry coupled to the multiple protocol stacks via the first switch logic, wherein, where an operational mode of the IC chip is configured, the first switch logic to communicate the first packet to the physical layer circuitry. The system further comprises a display device coupled to the IC chip, the display device to display an image based on a signal communicated by the IC chip via the physical layer circuitry.

In one embodiment, where the operational mode of the IC chip is configured, the physical layer circuitry to transmit the first packet from the IC chip. In another embodiment, the first one or more adapters each correspond to a different respective protocol, wherein, for each of the first one or more adapters, the adapter to perform a respective conversion between the corresponding protocol and a first protocol, wherein the protocol stacks are each to facilitate communication according to the first protocol. In another embodiment, the first protocol is compatible with a Thunderbolt™ specification. In another embodiment, the protocol stacks each include a respective transport layer and a respective logical layer. In another embodiment, the first one or more adapters include a first adapter to provide the first packet to the switch fabric and to receive the second packet from the switch fabric.

In another embodiment, the protocol stacks further include a second transmit protocol stack and a second receive protocol stack, wherein the IC chip further comprises second switch logic coupled between the switch fabric and the protocol stacks, and, where the test mode of the IC chip is configured, the second switch logic to provide the second packet to the second transmit protocol stack, the first switch component to receive the second packet from the second transmit protocol stack, and the first switch component to provide to the second receive protocol stack a third packet based on the second packet. In another embodiment, the first one or more adapters comprise a first adapter including test circuitry to generate the first packet. In another embodiment, the IC chip further comprises an interconnect, and a test controller coupled to the first one or more adapters via the interconnect, the test controller to perform an evaluation of the IC chip based on the second packet.

Techniques and architectures for providing test functionality with an integrated circuit chip are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An integrated circuit (IC) chip comprising:
   a first one or more adapters;
   a switch fabric coupled to the first one or more adapters;
   protocol stacks each coupled to the switch fabric, the protocol stacks including:
      a first transmit protocol stack to receive via the switch fabric a first packet from the first one or more adapters; and
      a first receive protocol stack;
   first switch logic coupled to the multiple protocol stacks, the first switch logic to receive the first packet from the first transmit protocol stack, wherein, where a test mode of the IC chip is configured, the first switch logic to provide to the first receive protocol stack a second packet based on the first packet; and
   physical layer circuitry coupled to the multiple protocol stacks via the first switch logic, wherein, where an operational mode of the IC chip is configured, the first switch logic to communicate the first packet to the physical layer circuitry.

2. The apparatus of claim 1, wherein, where the operational mode of the IC chip is configured, the physical layer circuitry to transmit the first packet from the IC chip.

3. The apparatus of claim 1, the first one or more adapters each corresponding to a different respective protocol, wherein, for each of the first one or more adapters, the adapter to perform a respective conversion between the corresponding protocol and a first protocol, wherein the protocol stacks are each to facilitate communication according to the first protocol.

4. The apparatus of claim 3, wherein the first protocol is compatible with a Thunderbolt™ specification.

5. The apparatus of claim 1, the protocol stacks each including a respective transport layer and a respective logical layer.

6. The apparatus of claim 1, the first one or more adapters including a first adapter to provide the first packet to the switch fabric and to receive the second packet from the switch fabric.

7. The apparatus of claim 1, the protocol stacks further including a second transmit protocol stack and a second receive protocol stack, wherein the IC chip further comprises:
   second switch logic coupled between the switch fabric and the protocol stacks, wherein, where the test mode of the IC chip is configured:
      the second switch logic to provide the second packet to the second transmit protocol stack;
      the first switch component to receive the second packet from the second transmit protocol stack; and
      the first switch component to provide to the second receive protocol stack a third packet based on the second packet.

8. The apparatus of claim 1, the first one or more adapters comprising a first adapter including test circuitry to generate the first packet.

9. The apparatus of claim 1, further comprising:
   an interconnect; and
   a test controller coupled to the first one or more adapters via the interconnect, the test controller to perform an evaluation of the IC chip based on the second packet.

10. A method at an integrated circuit (IC) chip, the method comprising:
    communicating a first packet from a first one or more adapters, via a switch fabric, to a first transmit protocol stack of multiple protocol stacks each coupled to first one or more adapters via the switch fabric;
    communicating the first packet from the first transmit protocol stack to first switch logic coupled between the multiple protocol stacks and physical layer circuitry;
    where a test mode of the IC chip is configured, providing a second packet from the first switch logic to a first receive protocol stack of the multiple protocol stacks, wherein the second packet is based on the first packet; and
    where an operational mode of the IC chip is configured:
       communicating the first packet to the physical layer circuitry; and
       communicating the first packet from the IC chip with the physical layer circuitry.

11. The method of claim 10, wherein the first one or more adapters each correspond to a different respective protocol, the method further comprising:
    for each of the first one or more adapters, the adapter performing a respective conversion between the corresponding protocol and a first protocol, wherein the protocol stacks are each to facilitate communication according to the first protocol.

12. The method of claim 11, wherein the first protocol is compatible with a Thunderbolt™ specification.

13. The method of claim 10, the protocol stacks each including a respective transport layer and a respective logical layer.

14. The method of claim 10, wherein communicating the first packet to the first transmit protocol stack includes communicating the first packet from a first adapter of the first one or more adapters, the method further comprising:

communicating the second packet from the multiple protocol stacks to the first adapter via the switch fabric.

15. The method of claim 10, further comprising:
communicating the second packet from the first receive protocol stack to second switch logic coupled between the multiple protocol stacks and the switch fabric, wherein, where the test mode of the IC chip is configured:
providing the second packet from the second switch logic to a second transmit protocol stack of the multiple protocol stacks;
communicating the second packet from the second transmit protocol stack to the first switch component; and
providing a third packet from the first switch component to a second receive protocol stack of the multiple protocol stacks, the third packet based on the second packet.

16. The method of claim 10, further comprising:
generating the first packet with test circuitry of the first one or more adapters.

17. A system comprising:
an integrated circuit (IC) chip comprising:
a first one or more adapters;
a switch fabric coupled to the first one or more adapters;
protocol stacks each coupled to the switch fabric, the protocol stacks including:
a first transmit protocol stack to receive via the switch fabric a first packet from the first one or more adapters; and
a first receive protocol stack;
first switch logic coupled to the multiple protocol stacks, the first switch logic to receive the first packet from the first transmit protocol stack, wherein, where a test mode of the IC chip is configured, the first switch logic to provide to the first receive protocol stack a second packet based on the first packet; and
physical layer circuitry coupled to the multiple protocol stacks via the first switch logic, wherein, where an operational mode of the IC chip is configured, the first switch logic to communicate the first packet to the physical layer circuitry; and
a display device coupled to the IC chip, the display device to display an image based on a signal communicated by the IC chip via the physical layer circuitry.

18. The system of claim 17, wherein, where the operational mode of the IC chip is configured, the physical layer circuitry to transmit the first packet from the IC chip.

19. The system of claim 17, the first one or more adapters each corresponding to a different respective protocol, wherein, for each of the first one or more adapters, the adapter to perform a respective conversion between the corresponding protocol and a first protocol, wherein the protocol stacks are each to facilitate communication according to the first protocol.

20. The system of claim 19, wherein the first protocol is compatible with a Thunderbolt™ specification.

21. The system of claim 17, the protocol stacks further including a second transmit protocol stack and a second receive protocol stack, wherein the IC chip further comprises:
second switch logic coupled between the switch fabric and the protocol stacks, wherein, where the test mode of the IC chip is configured:
the second switch logic to provide the second packet to the second transmit protocol stack;
the first switch component to receive the second packet from the second transmit protocol stack; and
the first switch component to provide to the second receive protocol stack a third packet based on the second packet.

\* \* \* \* \*